May 14, 1968  F. L. ZEISLER ET AL  3,383,532

HOMOPOLAR TRANSMISSION

Filed March 23, 1965  3 Sheets-Sheet 2

FREDERIC L. ZEISLER
OLE K. NILSSEN
INVENTOR.

BY  John R. Faulkner
Robert E. McCollum
ATTORNEYS

May 14, 1968  F. L. ZEISLER ET AL  3,383,532
HOMOPOLAR TRANSMISSION

Filed March 23, 1965  3 Sheets-Sheet 3

FREDERIC L. ZEISLER
OLE K. NILSSEN
INVENTOR.

BY John R. Faulkner
Robert E. McCollum
ATTORNEYS

United States Patent Office 3,383,532
Patented May 14, 1968

3,383,532
HOMOPOLAR TRANSMISSION
Frederic L. Zeisler and Ole K. Nilssen, Livonia, Mich., assignors to Ford Motor Company, Dearborn, Mich., a corporation of Delaware
Filed Mar. 23, 1965, Ser. No. 442,066
8 Claims. (Cl. 310—102)

ABSTRACT OF THE DISCLOSURE

A transmission having axially aligned generally conically shaped power input and output rotors nested in a manner providing electrical contact areas of narrow axial width spaced from each other, the transmission having a common stator center section.

---

This invention relates to an electric transmission mechanism. More particularly, it relates to one of the low voltage, high current, homopolar type providing an infinitely variable speed drive between a power input shaft and one or more power output shafts.

The invention provides a homopolar transmission construction consisting of the combination of a pluraliy of generator and motor units. The input and output rotors are essentially conically shaped, and may be in end-to-end as well as other relationships. The units are generally nested in a stator in a manner providing electrical contact areas of narrow axial width spaced from each other. This reduces the space and material weight requirements for the leads, and permits utilization of the magnetic material of the rotors and stator to conduct both magnetic flux and current. The transmission generally has a common stator center section that may or may not form a magnetic circuit common to both units, as desired.

The above construction results in a device that is small and relatively lightweight, is simple in construction, economical in operation, and yet is capable of a high power density. The construction eliminates the necessity for gearing, including that for reverse, while at the same time providing an infinitely variable speed forward or reverse drive.

It is one of the objects of the invention, therefore, to provide an electric transmission that is simple in construction, easy to assemble or disassemble, and efficient in operation. The transmission to be described uses economical magnetic materials; each half of the transmission is substantially a duplicate of the remaining half; the fewness of parts and the compactness of design renders it easy to assemble and disassemble; and it has a high torque-to-inertia ratio as well as good heat conductive paths from the heat sources to the heat rejection areas.

Another object of the invention is to provide an electric transmission of the homopolar type having means to reduce the demagnetizing effect of the cross field flux resulting from the induced current flow.

A further object of the invention is to provide a transmission of the type described in which materials of low magnetic permeability are inserted along the path of the induced current flow to not only limit the cross field flux force but direct a portion of it at an angle such that a component will result that will supplement the useful flux force.

A further object of the invention is to provide an electric transmission having a single input shaft in parallel with a number of output shafts, all enclosed by a common stator, the output shafts being drivable at varying speeds relative to each other.

A still further object of the invention is to provide an electric transmission of the homopolar type consisting of a generator and one or more motor units within a single stator, wherein rotation of the generator develops a voltage inducing current flow to produce a torque driving the motor units in any desired manner.

Other objects, features and advantages of the invention will become apparent upon reference to the succeeding, detailed description thereof, and to the drawings illustrating the preferred embodiments thereof, wherein.

Figure 2:
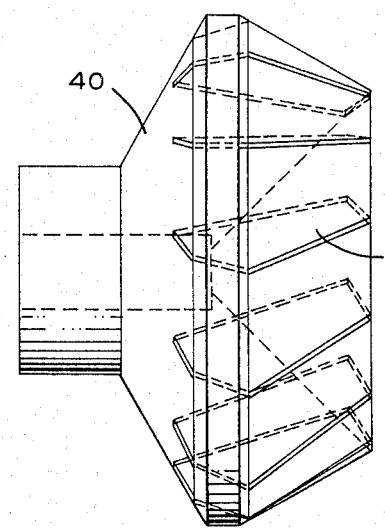
FIGURES 2 and 3 are enlarged side-elevational views of details of FIGURE 1.
Figure 2A:
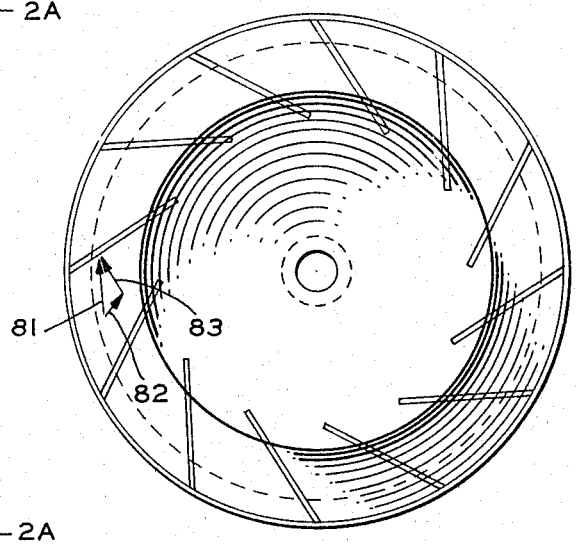
Figure 3:
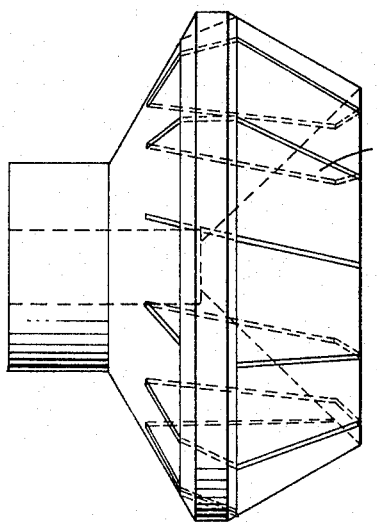
Figure 3A:
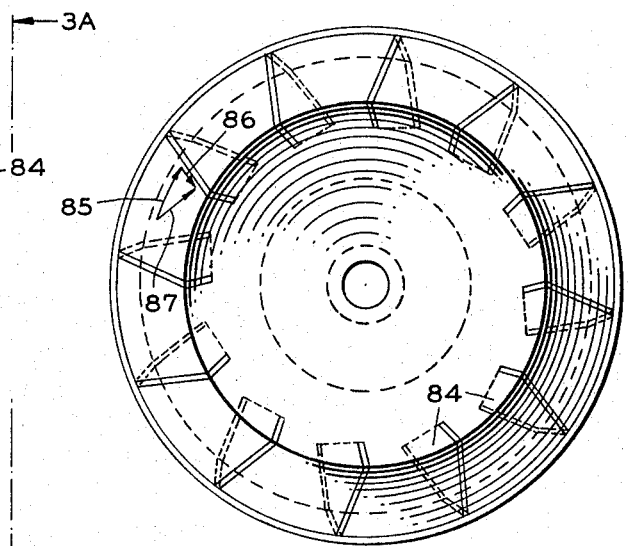
Figure 5:
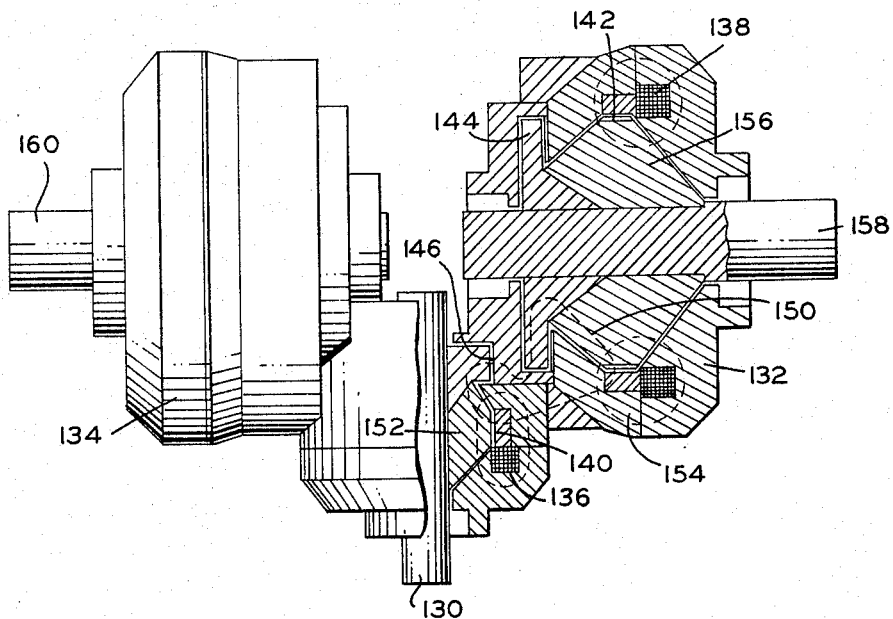
Figure 4:
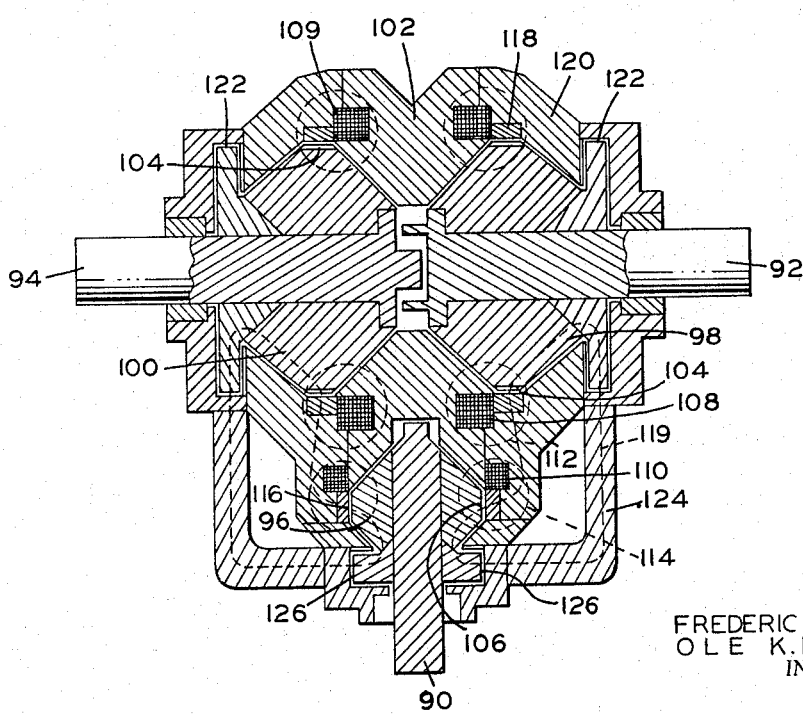

FIGURES 2a and 3a are end-elevational views taken on planes indicated by and viewed in the direction of arrows 2a—2a and 3a—3a of FIGURES 2 and 3, respectively;

FIGURE 4 is a plan view with parts broken away and in section of another embodiment of the invention;

FIGURE 5 is a cross-sectional view of a further embodiment of the invention; and FIGURES 6 and 7 show further embodiments of the invention.

Figure 1:
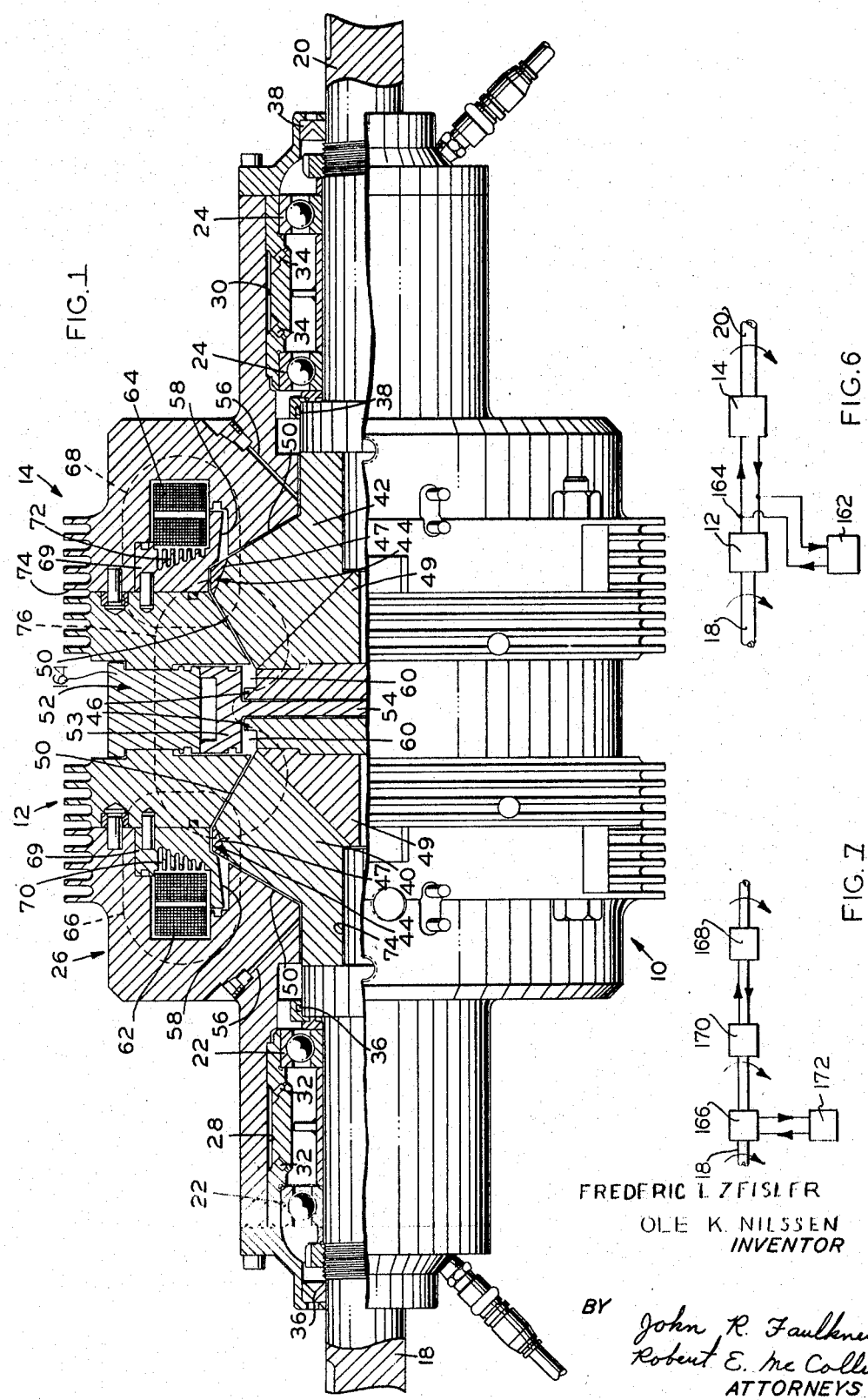
FIGURE 1 is a side-elevational view with parts broken away and in section of one form of transmission embodying the invention.

FIGURE 1 shows an electrical transmission 10 of the homopolar type. It consists of a generator unit 12 and a substantially identical but oppositely facing motor unit 14, in side-by-side relationship. The transmission has axially aligned power input and output shafts 18 and 20 that are rotatably supported on bearings 22 and 24 secured in a common housing or stator member 26. The bearings are lubricated by oil supplied from annular manifolds 28 and 30 through passages 32 and 34. Suitable seals 36 and 38 between rotors 18 and 20 and housing 26 prevent leakage of lubricant out of the bearing areas.

Both input and output shafts 18 and 20 have enlarged inner end rotor portions 40 and 42 that are essentially conically shaped in cross-section. The generator rotor 18 is driven by any suitable source of power, not shown, such as, for example, the output shaft of a motor vehicle internal combustion engine. Each of rotors 40 and 42 has axially spaced outer peripheral ring-like contact portions 44 and 46, the portions 44 including narrow rings of essentially nonmagnetic metal 47 of high electrical conductivity, such as copper, for example.

Stationary housing 26 surrounds and encloses both generator and motor rotors 40 and 42 and their shafts 18 and 20. The inner peripheral surface of the housing is shaped to mate or closely follow the shapes of rotors 40 and 42 and their shafts, with running clearance air gaps 50 between. The stator common center section 52 has an annular contact area portion 53 of copper, for example, with a narrow disc-like internal portion 54 separating rotors 40 and 42.

The air gaps 50 between rotors 40 and 42 and stator 26 partially contain a suitable electrical conducting fluid, such as mercury, for example. It is supplied to the gaps in any suitable manner, such as through passages 56. During normal rotation, the liquid metal is centrifuged outwardly to fill contact areas 44 and 46. Suitable annular collecting pools 58 and 60 are provided adjacent each of the contact areas into which the mercury can drain upon stoppage of the transmission.

Both the generator and motor portions of housing 26 contain field coils 62 and 64. When supplied with current, the coils generate closed magnetic field flux paths indicated by the dotted lines 66 and 68. The field current for control purposes may be supplied by any suitable means, such as, for example, an external generator driven by input shaft 18; or, if there is no requirement for external control to each unit, part or all of that unit's flux could be supplied by an internal series field, shunt field, or from permanent magnets suitably placed, for example.

The portions 69 of housing 26 adjacent coils 62 and 64 are provided with cooling fins 70 and 72 that cause heat to flow away from the coils as well as away from the liquid mercury contact areas 44 and 46. The housing 26 is provided with suitable oil or other cooling fluid channels or passages (not shown) leading to the areas adjacent the fins and contacts. Additional external cooling fins 74 are provided on the outer periphery of housing 26.

Before proceeding to a description of the operation, it should be noted that housing 26 would be formed for the most part of a suitable magnetic material such as iron, for example, or soft steel, although portions 69 in the current path adjacent liquid metal contacts 44 would be of non-magnetic conductive material, such as copper, for example. Similarly, the rotors 40 and 42 for the most part would be of iron except for the nonmagnetic ring conductor portions 47 and certain other sections, such as portions 49 in the current path. A coat of electrical insulation would be installed at the point of joinder of rotors 40 and 42 to their shafts, as well as between the parts 52 and 53.

With the above construction, the flux path follows the magnetic material, crossing the two air gaps between stator and rotor as it encircles the winding. The path shape is that of a hollow toroid, with field winding, liquid metal contact, and cooling channel contained within the path. The single electric current path travels through the machine using both stator and rotor copper and iron as flux and current conductors.

The transmission operates in a known manner. Current is initially supplied to both field coils 62 and 64 from a suitable source in the desired amount. The closed magnetic flux paths 66 and 68 are thus formed, which pass through portions of the generator and motor rotors 40 and 42, as described and indicated. When input rotor 40 is rotated, by and engine rotating shaft 18, for example, the the liquid mercury in pools 58 and 60 is centrifuged out and fills contact areas 44 and 46. Cutting the flux path 66 by the rotor develops a voltage between the contacts that induces a flow of current in the single closed path indicated by the dotted line 76. Thus current crosses from rotor to stator via the liquid metal contacts. That is, current flows, for example, from rotor 40 radially through the generator contact portion 46, across stator portion 53 to motor contact 46, entering the face of the motor rotor 42 at right angles to it, flowing hrough contact 44 to stator portion 52, across the stator and back to generator contact 44, and through contact 44 to again enter rotor 40, thus completing the path.

The current flow through output rotor 42 reacts with the field of coil 64 to exert a useful force or torque on output rotor 42 to rotate it. Rotation of output shaft rotor 42 cuts the field of coil 64 and immediately develops a counter EMF or back electromotive force that opposes the current flow. This back EMF Is proportional to the speed of rotation of output rotor 42, and, therefore, gradually increases until an equilibrium condition is obtained, at which time the product of magnetic flow and speed of both rotors 40 and 42 will be equal.

It will be clear that the magnitude and direction of the torque applied to the motor rotor can be controlled simply by suitably controlling the field currents to coils 62 and 64.

As stated previously, rotation of input rotor 40 induces a uniform current flow through the annular liquid metal contacts into the rotor. With the construction as shown, the current flows into and out of the rotor portions or surfaces in a direction substantially perpendicular to the surface which it is entering or leaving. Current thus enters and leaves the rotors radially and flows essentially axially in the rotor. The flow of current, however, itself produces a demagnetizing effect by reason of the cross field flux force developed. That is, the magnetic field of each current element entering the rotor is additive, and produces a net cross field. As best seen in FIGURE 1, the useful flux force of the field coil acts essentially axially through the rotor; the cross field flux force, however, is essentially at right angles to the useful flux. The vectorial resultant of the two fluxes, therefore, is in a direction reducing the useful reflux force.

It will be seen, therefore, that the effect of the load current is to provide a magnetic field that decreases the useful flux. This necessitates an increase in field current to maintain a given flux, and, therefore, the use of a larger field coil. The use of a larger field coil would also necessitate a larger stator section, increasing the field flux paths and weight and other losses.

The invention provides a construction that not only controls the cross field flux force but utilizes it to supplement the use flux force and, therefore, lower the field coil requirements. That is, the force due to the magnetic field of the current flow is directed such that it is additive to the field coil useful force; therefore, a smaller field coil can be used to provide satisfactory operation of the transmission. With a smaller field coil, a smaller diameter stator is required, requiring less material and making it more economical to manufacture, and providing lower losses.

FIGURES 2, 2a, 3 and 3a show several embodiments of an input rotor with inserts 80 to control the cross field flux or magnetic field of the current. Although the input rotor is shown as the member containing inserts 80, it is to be noted that these inserts could be provided along any portion of the path of the current flow.

It is known in the prior art to provide load current reaction controlling inserts that extend radially outwardly from the hub of the rotor. These inserts are of an essentially nonmagnetic material, and act as barriers to the passage of a magnetic field through them at right angles. They thus control the cross field flux, but do not utilize it to supplement the useful flux.

FIGURES 2 and 2a show one construction wherein the inserts 80 in the rotor 40 not only limit the cross field flux forces, but also provide a force that is additive to the useful force provided by the magnetic field of the coil. More specifically, as best seen in FIGURE 2, the outer peripheral portion of rotor 40 is provided with trapezoidal-like-shaped inserts 80 of a material of low magnetic permeability, such as copper or aluminum, for example. The inserts are thin; that is, the material is about one-half of the thickness of the air gap 50 (FIGURE 1) between the rotor and stator so that the resistance to cross flux flow through the air gap is greater than the resistance of the material of inserts 80. This retards cross flux flow at the periphery from flowing around the end of the insert through the air gap and thus undesirably influencing the field coil useful flux.

As can best be seen in FIGURE 2a, the vertical axes of inserts 80 are inclined with respect to a radius of the rotor, although the longitudinal or horizontal axes are all substantially parallel to the rotor axis. It can thus be seen that the axial flow of the current out of the plane of the paper, as it passes along the path indicated in dotted lines at 76 in FIGURE 1, causes the cross field flux generated to provide a net force in a clockwise direction as indicated by arrow 81. Since the inserts or barriers 80 are inclined with respect to the rotor radius, the force 81 is broken up into parallel and penpendicular components. The parallel component 82 is in the same direction and is additive to the useful flux force, while the perpendicular component 83 is stopped by the insert. It will be seen that by suitably choosing the angle that the inserts make with respect to the radius of the rotor, that the demagnetization effects of the cross flux can not only be minimized but also be additive to the useful flux force.

FIGURES 3 and 3a show still another construction for input rotor 40. In these figures, the rotor is provided again with suitable non-magnetic inserts 84 of low resistivity. The inserts 84 have a compound inclination; that is, their axes are inclined not only with respect to a radius of the rotor, but also with respect to the rotor axis. That is, the inserts are given a combined orientation that will best decrease the cross field demagnetizing effects while at the same time providing a component of force that will supplement the coil useful flux force. The inclination causes the cross field flux force vector 85 to be broken up again into a useful component 86 in the direction of the field coil flux force, and a component 87 at right angles to the insert, which hinders its passage.

FIGURES 4 and 5 show embodiments of the invention in which a single generator unit drives one or more motor shafts in parallel at variable speeds without the use of a clutch or sliding gear between the units. FIGURE 4 shows a stator construction providing a common magnetic circuit between input and outputs, while FIGURE 5 shows a construction with a common conductive circuit.

More specifically, FIGURE 4 shows an input shaft 90 located at right angles to two power output shafts 92 and 94 that are axially aligned, such as, for example, motor vehicle axle shafts. Both the input and output shafts have conically shaped rotors 96, 98 and 100 that are enclosed by a single stator 102 in a manner similar to that shown in FIGURE 1. The housing is matingly shaped and common to all three shafts. The magnetic circuit of the stator is thus common to the generator and motor units. The shape described provides narrow liquid metal contacts 104 and 106 adjacent field coils 108, 109, 110 providing closed magnetic paths indicated by the dotted lines 112 and 114.

Upon supplying current to coil 110, and equally to coils 108 and 109, and rotation of generator shaft 90 and rotor 96, a voltage will be developed that induces current flow in the two closed paths indicated by the dotted lines 119. The current thus flows, for example, from the generator rotor 96 through the liquid metal contacts 106, through the conductive material 116 and 118 of stator 120, through the liquid metal contacts 104, through the motor rotors 98 and 100 and the liquid metal contacts 122, the stator portion 124, liquid contacts 126, and back into the generator rotor.

The FIGURE 4 embodiment for the most part operates similarly to that described in connection with the FIGURE 1 embodiment. That is, rotation of the generator rotor 96 causes a torque to be developed simultaneously on both of the output rotors 98 and 100, assuming that equal field currents are supplied to the stator field coils 108 and 109. Simultaneously, upon their rotation, both of the output rotors will develop a back EMF that opposes the input EMF, and the output shafts will pick up in speed until the product of the magnetic fluxes and speeds of the rotors is equal.

With such a construction, the unit of FIGURE 4 can be utilized as a nonslip differential or as a steering mechanism by selectively controlling the field currents to each of the motor units. That is, the power and speed of the output shafts could be changed continuously from a positive to a negative value with respect to the input shaft. For a nonslip differential, with the output shafts 92 and 94 connected in parallel as shown in FIGURE 4, any change in load on one of the output shafts would automatically shift the power to the shaft moving slower than the control calls for. This is due to the fact that the back EMF of the slower moving shaft would be less, and, therefore, more current and power would be applied to this shaft. Also, by suitably controlling the direction of application of flux to either of the output motors, the direction of rotation and relative speed of each of the shafts with respect to each other can be controlled.

FIGURE 5 shows a single input shaft driving two output shafts in parallel and at variable speeds, if desired, the two output motors in this case, however, not having a common magnetic circuit through a common stator, but having a common conductive circuit with the input generator. More specifically, a single input generator rotor 130 is positioned at right angles to two axially aligned motors each with its own stator housing 132 and 134 between the repsective motors and the generator. Suitable field coils 136 and 138 and narrow liquid metal contacts 140, 142, 144 and 146 are provided, as shown, in substantially the same manner as that described in connection with the FIGURE 4 embodiment.

Rotation of generator rotor 130 causes current flow in the somewhat triangularly-shaped closed path 150 shown in FIGURE 5. In this instance, the flow is from the rotor magnetic material 152 through the liquid metal contact 140, the magnetic and conductive portions of the stator housing portion 154, the contact 142, the magnetic and conductive portions of the output rotor 156, the contacts 144 and 146, and returning via the conductive portions of the members. Again, by suitably controlling the current to the respective field coils, the relative direction and speed of rotation of either of the output shafts 158 or 160 with respect to each other and generator rotor 130 can be controlled as desired to provide a non-slipping type differential unit or a controllable steering unit.

While FIGURES 4 and 5 show the output rotors as being at right angles to the input rotor and axially aligned with each other, it will be clear that they could be misaligned, that is, at angles to each other, without departing from the scope of the invention. It will also be clear that while the FIGURES 4 and 5 embodiments show a single input rotor and two output rotors, that alternately, various combinations of pluralities of input and output rotors could be used.

Torque transmitting devices constructed in the manner described above in connection with any of the FIGURES 1–5 embodiments provide highly efficient and easily controllable transmissions. Such a transmission provides a continuously variable output, with relative speeds between the shafts, if more than one is driven, being controlled simply by adjusting the current to the coils.

The substantially truncated conical shape of both input and output rotors maximizes the ratio of developed power to viscous power loss and the torque to inertia ratio, as well as reduces the required field power. More specifically, the liquid metal contact areas are narrow and adjacent the cooling medium in the stator copper contact. The viscous power losses in the mercury are thereby minimized. Also, less voltage is induced in the liquid mercury itself. Therefore, less non-magnetic material need surround the contact area, which results in a shorter field flux path because the flux has less non-magnetic material to go around. A shorter field flux path reduces the required size of the field coil, which reduces the over-all size of the transmission. This reduces the inertia losses.

The resistivity and inertia losses in the rotor are also less due to the conical rotor shape providing a decreasing area of material towards the contact.

Furthermore, the conical shapes permit the use of separated liquid metal pools, which reduces the likelihood of the current path at low speeds short circuiting by flowing solely through the liquid mercury and thereby reducing the useful energy. That is, the liquid metal in this construction even at low speeds is kept in the small pools near the contacts, and is drawn out by centrifugal force into the contact areas so that the remaining portions of the air gap 50 between rotor and stator will be essentially free of mercury, thereby preventing the bypass action described.

It should be noted that other power sources, both electrical and mechanical in nature, and of relatively different power levels, could be used with the transmissions of FIGURES 1–5. For example, FIGURE 6 illustrates schematically a transmission similar to FIGURE 1, with an additional electrical supply 162 that could be connected to the stator center section 52, using parts 53 and 164 (FIGURE 1) as electrical terminals. The source 162 could supply electrical power for transient load power requirements, for example, while the average power could be supplied from the shaft input by the engine. The electrical supply could be, for example, batteries, or a motor/ generator and a flywheel. If the unit 162 were batteries, they could be charged from these same terminals 164 and 53. If the unit 162 were in the form of a motor/generator driving/being driven by a flywheel, energy would be stored in the form of the rotational speed of the flywheel.

FIGURE 7 shows schematically, a different arrangement. In this case, the transmission consists of two motor units 166 and 168, with a single generator unit 170 between. The units are each constructed in a manner similar to the construction of the individual units of FIGURES 1–6. That is, they would have conically shaped rotor and stator portions with narrow width liquid metal contacts. The input to generator 170 is essentially electrical and consists of the motor 166 supplied primarily with power from a constant voltage electrical source 172. It could also, of course, be rotated by input shaft 18, if desired. The electrical supply 172 could again be batteries, for example, and could drive the vehicle exclusively at times, if desired. The mechanical input drive of shaft 18, by the engine described previously in connection with FIGURE 1 could, for example, be used to provide a long operational range that would not normally be available from the use of batteries. With this arrangement, the input power source and the load are coupled with fewer restraints than with a simple motor. For example, a load requiring independently variable speed and torque could be supplied from the constant voltage source. The input motor 166 would match the constant voltage requirement of supply 172, while the generator-motor unit 170, 168 combination would supply the independently variable speed and torque requirements.

From the foregoing, therefore, it will be seen that a construction according to the invention allows an optimum use of substantially all of the material with a minimum field power, resulting in a minimizing of losses, an increase in efficiency and power density, and good heat transfer. It will also be seen that the invention provides an infinitely variable speed drive of one or more shafts from one or more inputs; and, that the cross field flux demagnetizing effects are controlled so as to be useful.

While the invention has been illustrated in its preferred embodiments in the figures, it will be clear to those skilled in the arts to which the invention pertains that many changes and modifications may be made thereto without departing from the scope of the invention.

We claim:

1. A variable speed electric power transmitting mechanism comprising, axially aligned substantially conically shaped power input and output rotor members, a stator member common to and having a shape mating with said rotor members, means rotatably mounting said rotor members within said stator member in a nested manner with a running clearance air gap between each of said rotor members and between said rotor members and said stator member, said construction providing electrical contact portions of narrow axial width at the outermost peripheral portions of each of said rotor members, means producing magnetic fields passing through portions of said stator member and each of said rotor members, and liquid metal electrical contact means in the said contact portions, rotation of said input rotor member inducing a current flow through said contact means and stator and rotor members in a closed path intersecting the magnetic field to thereby apply a torque to and effect a rotation of said output rotor member.

2. A variable speed electric power transmitting mechanism comprising, axially aligned substantially conically shaped power input and output rotor members, a stationary housing member of magnetic material having a shape mating with those of said rotor members, means rotatably mounting said rotor members within said housing member in a nested manner with a running clearance air gap between each of said rotor members and between said rotor members and said housing member, said construction providing electrical contact portions of narrow axial width at the outermost peripheral portions of each of said rotor members, means producing magnetic fields passing through portions of said housing member and each of said rotor members, liquid metal contact electrical conducting means in the said contact portions, rotation of said input rotor member inducing a current flow through said contact means and stator and rotor members in a closed path intersecting portions of the magnetic field to thereby apply a torque to and effect a rotation of said output rotor member, and means to reduce the cross field force produced by said current flow, said latter means including a plurality of spaced elements of low magnetic permeability in one of said members located in the path of the cross field force and at an angle thereto whereby a component of the cross field force is provided that supplements the useful magnetic field force.

3. A variable speed electric power transmitting mechanism comprising, axially aligned substantially conically shaped power input and output rotor members, a stationary housing member having a shape mating with those of said rotor members, means rotatably mounting said rotor members within said housing member in a nested manner with a running clearance air gap between each of said rotor members and between said rotor members and said housing member, said construction providing electrical contact portions of narrow axial width at the outermost peripheral portions of each of said rotor members, means producing useful magnetic fields passing through portions of said housing member and each of said rotor members, electrical contact means in the said air gaps at said contact portions, rotation of said input rotor member inducing a current flow through said contacts and housing and rotor members in closed paths intersecting portions of the magnetic fields to thereby effect a rotation of said output rotor member, and means to control the magnetic field of the induced current, said latter means including a plurality of spaced substantially nonmagnetic elements in one of said members located in the path of the cross field force and at a compound angle to the axes of the said latter member whereby a cross field component of force is provided that is supplemental to the useful magnetic flux force.

4. A variable speed electric power transmitting mechanism comprising, plurality of power output members, a power input drive member common to both of said output members, said input and output rotor members having substantially a conical shape in cross section, a stationary housing member common to and between said rotor members having a shape mating with those of said rotor members, means rotatably mounting said rotor members and housing member in a nested manner with running clearance air gaps between each of said rotor members and between said rotor members and said housing member, said construction providing spaced narrow axial width contact portions between said rotor members and housing member, and adjustable means producing varying strength magnetic fields passing through portions of said housing member and each of said rotor members, electrical conducting means in the said air gaps between said contact portions, rotation of said input rotor member inducing a current flow through said contacts and housing and each of said rotor members in a closed path intersecting portions of the magnetic fields to thereby effect a rotation of each of said output rotor members, and means to individually adjust the magnetic field strength of said output rotor members to effect a change in speed of one of said output rotor members relative to the other.

5. An electrical power transmission means comprising a rotatable input rotor, a plurality of output rotors, and a stationary housing enclosing and separating said rotors, said housing having a plurality of field coil means for producing magnetic fields between each of said rotors and said housing, contact means between spaced portions of said housing and rotors, rotation of said input rotor inducing a flow of current through said contacts and housing and rotors in a closed path to effect a rotation of said output rotors, and means to vary the magnetic field strength of each of said output rotors to vary the relative speeds of said output rotors.

6. An electric power transmission means comprising a rotatable input rotor, a plurality of output rotors, and a stationary housing between said rotors, each of said rotors having substantially a conical shape, said housing having a shape mating with the shapes of said rotors whereby said housing and rotors are assembled in a nested manner to provide spaced narrow electrical contact portions between said rotors and said housing, said housing having a plurality of field coil means for producing closed magnetic fields between each of said rotors and said housing, electrical conducting means in the contact portions of said housing and rotors, rotation of said input rotor inducing a flow of current through said contact means and housing and rotors in closed paths to effect a rotation of said output rotors, and means to vary the magnetic field strength of said coils associated with each of said output rotors to vary the relative speed differential of said output rotors.

7. An electric power transmission means, comprising a plurality of output rotors, a rotatable input rotor common to said output rotors, and a stationary housing between said input and output rotors, said housing having a plurality of adjustable means for producing magnetic fields between said housing and each of said rotors, said rotors each having a substantially conical shape, said housing having a mating shape permitting a nesting arrangement of said housing and rotors when assembled and defining a number of axially spaced contact portions of narrow axial width between said housing and rotors, electrical contact means between said contact portions, rotation of said input rotor inducing a flow of current through said contact means and housing and rotor in separate closed paths between said input rotor and said housing and each of said output rotors to effect a separate rotation of said output rotors, and means to vary the strength of the magnetic field associated with each of said output rotors to vary the relative speed differential of said output rotors.

8. A variable speed electric power transmitting mechanism for transmitting power from a generator to a plurality of motors, comprising, a plurality of axially aligned motor rotor members, a power input generator rotor member common to both of said utput members, said input and output rotor members having substantially conical shapes, a stationary housing member surrounding said motor rotor members and mating therewith and with said generator rotor member with running clearance air gaps therebetween, said mating relationship providing spaced narrow axial width contact portions, and adjustable field coil means in said housing adjacent each of said rotors for producing varying strength magnetic fields passing through portions of said housing member and each of said rotor members, liquid electrical contact means in said contact portions, rotation of said generator rotor member inducing a parallel current flow between said contacts and housing and each of said rotor members in closed paths intersecting portions of the magnetic fields to thereby effect a rotation of each of said output rotor members, the individual adjustment of the field coil strength associated with said motor rotor members effecting a change in speed of one rotor member relative to the other.

References Cited

UNITED STATES PATENTS

| 1,507,825 | 9/1924 | Gill et al. | 310—178 |
| 1,987,479 | 1/1935 | Japolsky | 310—102 |
| 2,979,630 | 4/1961 | Bishop et al. | 310—102 |
| 3,163,792 | 12/1964 | Sayers | 310—102 |

FOREIGN PATENTS 1,139,343  11/1962  Germany.

ROBERT K. SCHAEFER, *Primary Examiner.*

H. O. JONES, *Assistant Examiner.*